(12) United States Patent
Huang et al.

(10) Patent No.: US 11,894,931 B2
(45) Date of Patent: Feb. 6, 2024

(54) SELECTIVE BUNDLING TECHNIQUES FOR HARQ-ACK FEEDBACK

(71) Applicant: QUALCOMM Incorporated, San Diego, CA (US)

(72) Inventors: Yi Huang, San Diego, CA (US); Wanshi Chen, San Diego, CA (US); Jing Lei, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 233 days.

(21) Appl. No.: 17/313,782

(22) Filed: May 6, 2021

(65) Prior Publication Data

US 2021/0351876 A1 Nov. 11, 2021

Related U.S. Application Data

(60) Provisional application No. 63/022,409, filed on May 8, 2020.

(51) Int. Cl.
*H04W 28/06* (2009.01)
*H04L 1/1812* (2023.01)
(Continued)

(52) U.S. Cl.
CPC .......... *H04L 1/1819* (2013.01); *H04L 1/1854* (2013.01); *H04L 1/1896* (2013.01); *H04W 28/06* (2013.01)

(58) Field of Classification Search
CPC ... H04L 1/1896; H04L 1/1854; H04L 1/1819; H04L 1/1912; H04L 1/1812; H04W 28/06
See application file for complete search history.

(56) References Cited

U.S. PATENT DOCUMENTS

2020/0412485 A1\* 12/2020 Wang ................... H04L 1/0073
2022/0321308 A1\* 10/2022 Yu ......................... H04L 1/1861
(Continued)

FOREIGN PATENT DOCUMENTS

WO 2019019184 A1 1/2019

OTHER PUBLICATIONS

Nokia et al: "Remaining aspects of HARQ management" 3GPP TSG RAN WG1 Meeting 90bis, Prague, Czech, Oct. 9-13, 2017.
(Continued)

*Primary Examiner* — Kent Krueger
(74) *Attorney, Agent, or Firm* — Shumaker & Sieffert, PA

(57) ABSTRACT

Apparatus, methods, and computer-readable media for managing HARQ-ACK processes in wireless user equipment (UEs) allow selective compression of HARQ-ACK information within HARQ-ACK codebooks. A wireless base station may transmit control information including scheduling information for K downlink transport blocks for a UE, and may signal bundling rules for selectively compressing an original HARQ-ACK codebook of size K into a constrained HARQ-ACK codebook of size N<K. Bundling rules can include the maximum codebook size N, a number M of bits that should not be bundled, criteria for bundling a plurality of the K–M bits into N–M bits, etc. The UE can apply a logical AND operation to ACK/NACK bits to produce one or more representative bundled bits. The base station identifies and schedules retransmission of packets associated with all of a bundled set of A/N bits if their representative bundled bit is NACK.

26 Claims, 11 Drawing Sheets

(51) Int. Cl.
  *H04L 1/1867* (2023.01)
  *H04L 1/1829* (2023.01)

(56) References Cited

U.S. PATENT DOCUMENTS

2022/0353891 A1* 11/2022 Kang ................... H04W 72/23
2022/0377765 A1* 11/2022 Zhang ................ H04W 72/569
2023/0016851 A1*  1/2023 Li ........................ H04L 1/1825

OTHER PUBLICATIONS

International Search Report and Written Opinion issued in corresponding PCT Application No. PCT/US2021/031356, dated Jul. 26, 2021.

* cited by examiner

SELECTIVE BUNDLING TECHNIQUES FOR HARQ-ACK FEEDBACK

CROSS-REFERENCE TO RELATED APPLICATIONS

This application claims the benefit of U.S. Provisional Patent Application No. 63/022,409, filed May 8, 2020 and entitled "Selective Bundling of HARQ-ACK Feedback for Reduced-Capability Device," the disclosure of which is incorporated by reference herein in its entirety.

TECHNICAL FIELD

The technology discussed below relates generally to wireless communication systems, and more particularly, to reduction of uplink payload for reduced-capability wireless communication devices. Embodiments can provide and enable techniques for dynamically and/or selectively modifying HARQ-ACK codebook sizes for various device types (e.g., size reduction for reduced-capability devices) that can aid in improving device performance, system throughput, and high data rates.

INTRODUCTION

In a wireless communication system configured according to 3GPP specifications for New Radio (NR), user equipment (a UE) may perform integrity checking of wireless data received on one or more communication channels. The UE generates results of these checks and reports the results to a wireless base station that coordinates downlink transmissions to the UE, so that the base station can coordinate re-transmission of any data that did not pass the integrity checks. A common process for this is known as hybrid automatic request acknowledgment (HARQ-ACK) feedback generation, and the integrity checking results may be in the form of a binary bit for each check performed, where the value is '1' (i.e., 'ACK') if the integrity check was successful, and '0' (i.e., NACK) if the integrity check was not successful. The bits, known as A/N bits, may be aggregated in a predetermined sequence known as a HARQ-ACK codebook.

There is a desire in the field for future NR specifications to address use cases for a variety of device classes and types. One area relates to reduced-capability UEs ("RedCap" UEs). These connected devices may have tapered efficiency and/or cost-effectiveness parameters achieved via reduced capabilities such as a relatively narrow bandwidth or reduced access to network resources. For example, a reduced-capability UE may have access to a smaller uplink payload size, represented in physical uplink control channel (PUCCH) resources allocated to the UE. Consequently, each bit of PUCCH resources that the HARQ-ACK codebook consumes can limit other control information the UE is able to send back to the base station.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, a wireless communication device operable as user equipment (a UE) is provided. The device includes a processor, memory coupled to the processor, and a transceiver coupled to the processor. The processor and memory are configured to cause the device to receive, via the transceiver, multiple downlink transmissions forming a downlink message. The processor and memory are further configured to cause the device to receive, via the transceiver, information indicating that an amount of feedback information allowed for a feedback transmission is insufficient to transmit feedback information indicating whether the multiple downlink transmissions forming the downlink message were successfully decoded by the wireless communication device.

The processor and memory are further configured to cause the device to transmit, via the transceiver, compressed feedback information and uncompressed feedback information. The compressed feedback information is a first portion of the feedback information in compressed form and the uncompressed feedback information is the second portion of the feedback information that is different from the first portion of the feedback information.

In another aspect, a method of wireless communication device operable by user equipment (a UE) is provided. The method includes receiving, via a transceiver, multiple downlink transmissions forming a downlink message. The method further includes receiving, via the transceiver, information indicating that an amount of feedback information allowed for a feedback transmission is insufficient to transmit feedback information indicating whether the multiple downlink transmissions forming the downlink message were successfully decoded by the wireless communication device.

The method further includes transmitting, via the transceiver, compressed feedback information and uncompressed feedback information. The compressed feedback information is a first portion of the feedback information in compressed form and the uncompressed feedback information is the second portion of the feedback information that is different from the first portion of the feedback information.

In another aspect, a wireless communication device operable as a base station (BS) is provided. The device includes a processor, memory coupled to the processor, and a transceiver coupled to the processor. The processor and memory are configured to cause the device to transmit downlink transmissions forming a downlink message to user equipment (a UE) via the transceiver. The processor and memory are further configured to cause the device to transmit control information associated with the set of downlink transmissions via the transceiver. The control information indicates that the wireless communication device is configured to receive an allowed amount of feedback information indicating whether the downlink message was successfully decoded by the UE.

The processor and memory are further configured to cause the device to receive, as the feedback information, compressed feedback information and uncompressed feedback information via the transceiver. The compressed feedback information is a first portion of the feedback information in compressed form and indicates whether a first portion of the downlink message was successfully decoded by the UE. The uncompressed feedback information is a second portion of the feedback information and indicates whether a second portion of the downlink message that differs from the first portion of the downlink message was successfully decoded by the UE.

In another aspect, a method of wireless communication device operable by a base station (BS) is provided. The method includes transmitting downlink transmissions forming a downlink message to user equipment (a UE) via a transceiver. The method further includes transmitting control information associated with the set of downlink transmissions via the transceiver. The control information indicates that the wireless communication device is configured to receive feedback information indicating whether the downlink message was successfully decoded by the UE.

The method further includes receiving, as the feedback information, compressed feedback information and uncompressed feedback information, via the transceiver. The compressed feedback information is a first portion of the feedback information in compressed form and indicates whether a first portion of the downlink message was successfully decoded by the UE. The uncompressed feedback information is a second portion of the feedback information different from the first portion of the feedback information and indicates whether a second portion of the downlink message that differs from the first portion of the downlink message was successfully decoded by the UE.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Figure 1:
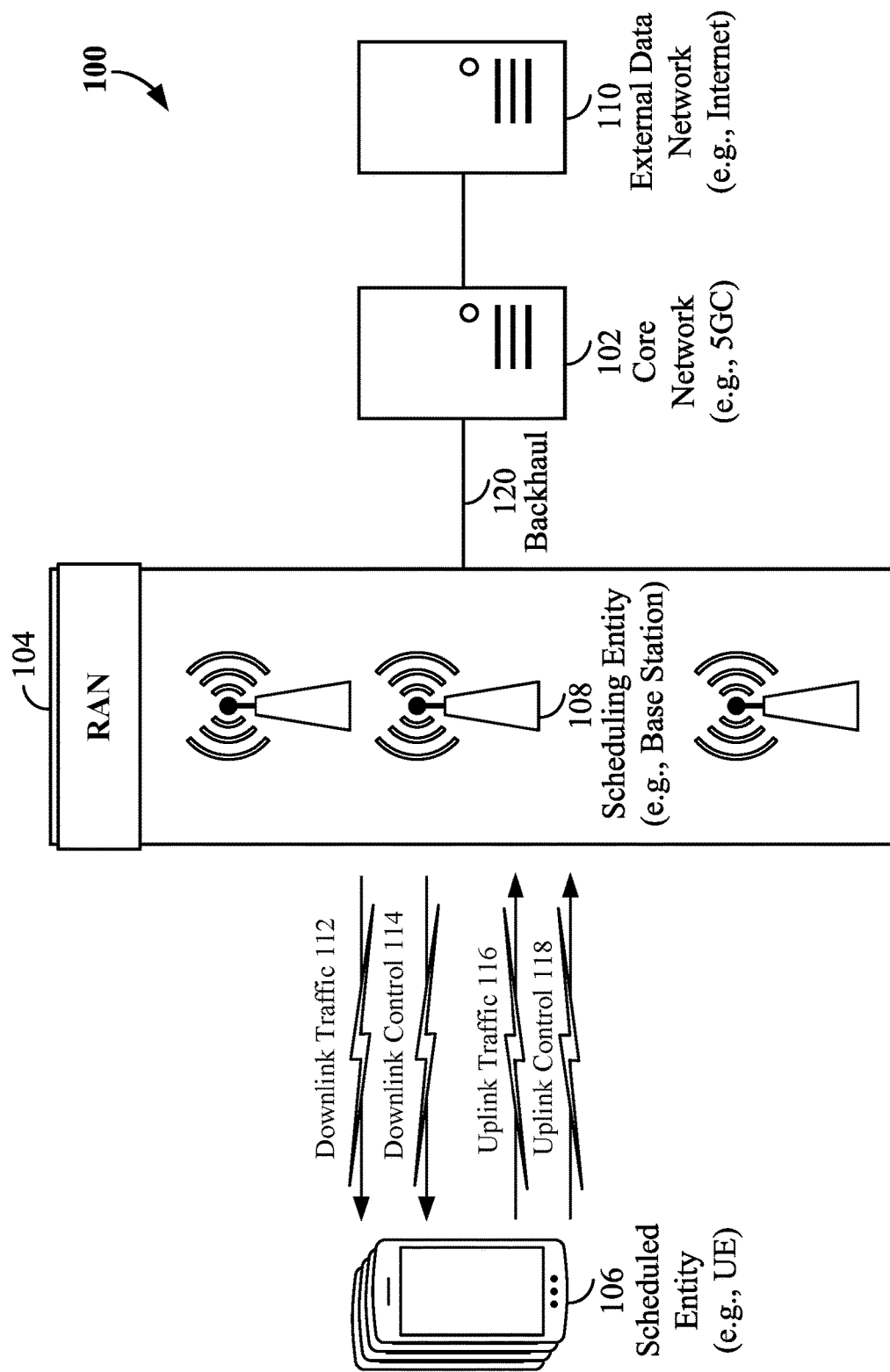
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and user equipment (a UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

It has been observed that Rel-15 and Rel-16 of 3GPP specifications for 5G NR appear primarily to focus on premium smartphones and other verticals (e.g., V2X and IIOT). However, there is a desire in the art for NR to address use cases that only require reduced-capability UEs. For these use cases, UEs having peak capabilities are not required. Rather, it is desired that reduced-capability UEs may be deployed for these use cases, and configured to operate with improved efficiency and cost-effectiveness. Some examples of these reduced-capability NR devices include wearable devices, industrial wireless sensor networks (IWSN), and surveillance cameras. Within the present disclosure, a reduced-capability UE or reduced-capability device generally refers to a UE having one or more reduced functional parameters, including but not limited to a reduction in supported bandwidth and/or maximum data rate compared to legacy or conventional UEs such as smart phones; a reduced number of UE antennas; the use of half-duplex communication; relaxed UE processing time; and/or relaxed UE processing capability. Reduced-capability UEs may additionally or alternatively employ one or more power saving and battery lifetime enhancement features, such as reduced control channel monitoring, extended discontinuous reception (DRX) times, etc.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. The term downlink may additionally or alternatively refer to a point-to-point, or unicast, transmission originating at the scheduling entity and received by one UE (e.g., UE 106). Transmissions from a UE (e.g., UE 106) to a base station (e.g., base station 108) may be referred to as uplink (UL) transmissions. In accordance with further aspects of the present disclosure, the term uplink may refer to a point-topoint transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a base station 108 may broadcast downlink traffic 112 to one or more scheduled entities 106. Broadly, the base station 108 is a node or device responsible for scheduling traffic in a wireless communication network, including the downlink traffic 112 and, in some examples, uplink traffic 116 from one or more UEs or scheduled entities 106 to the base station 108. On the other hand, the UE or scheduled entity 106 is a node or device that receives downlink control information 114, including but not limited to scheduling information (e.g., a grant), synchronization or timing information, or other control information from another entity in the wireless communication network such as the base station 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
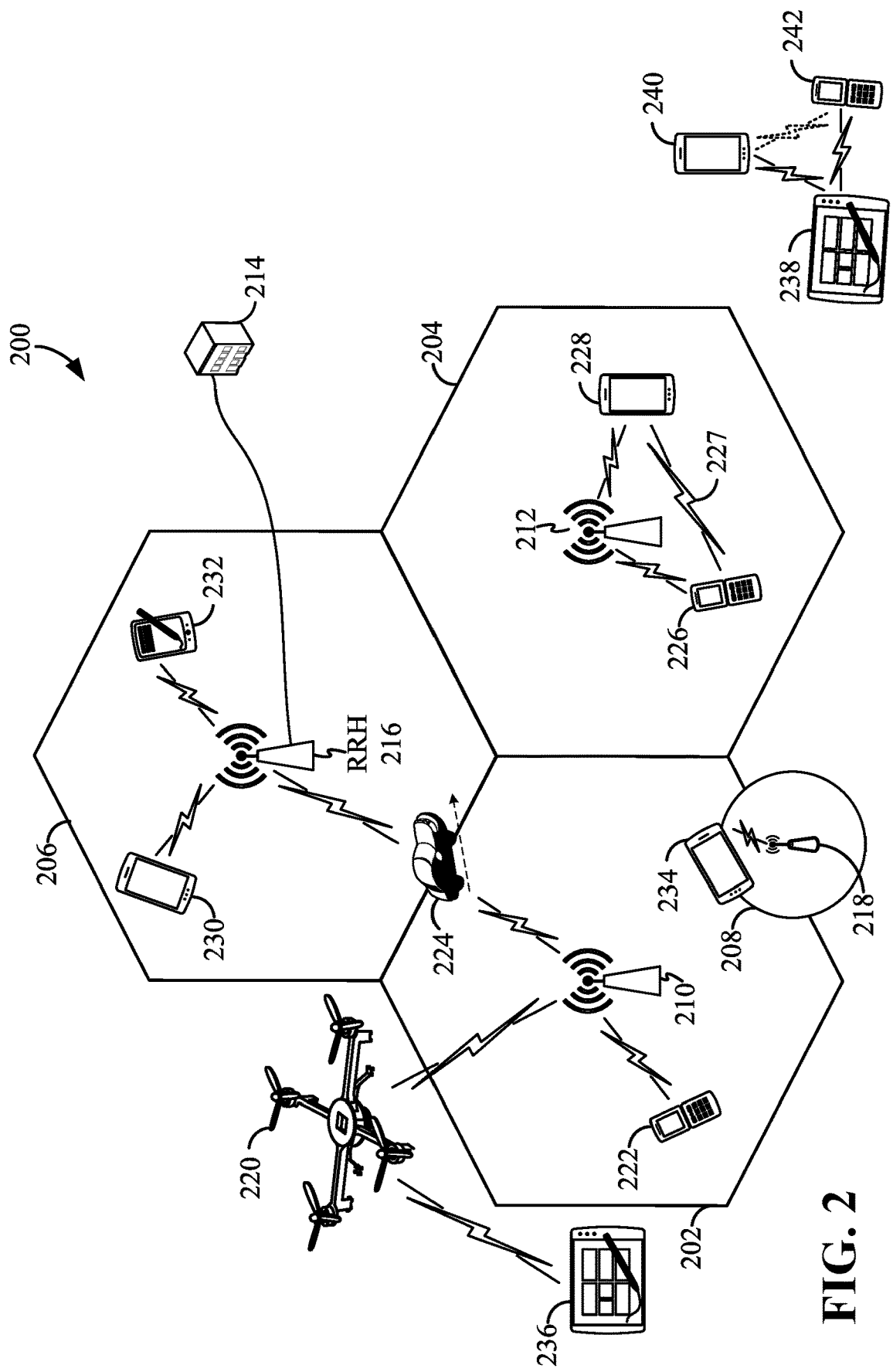
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by user equipment (a UE) based on an identification broadcasted from an access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing That is, at some times the channel is dedicated for transmissions in one direction, while at other times the channel is dedicated for transmissions in the other direction, where the direction may change very rapidly, e.g., several times per slot.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), and orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform or other suitable waveforms in substantially the same way as described herein below. That is, while some examples of the present disclosure may focus on an OFDM link for clarity, it should be understood that the same principles may be applied as well to other DL or UL transmission waveforms.

Further, in examples of the present disclosure, a frame may refer to a common duration (e.g., 10 ms) for wireless transmissions; each frame can include a certain number of (e.g., 10) subframes of 1 ms each. On a given carrier, there may be one set of frames in the UL, and another set of frames in the DL. An expanded view of an example DL subframe 302 illustrates an example resource grid 304. In the illustrated example, the resource grid 304 is organized as an OFDM resource grid; however, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

In another example, the resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers. Within the present disclosure, it is assumed that a single RB such as the RB 308 entirely corresponds to a single direction of communication (either transmission or reception for a given device). A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308.

Further, in this illustration, the RB 308 is shown as occupying less than the entire duration of the subframe 302, although this is merely one possible example.

Each subframe 302 (e.g., a 1 ms subframe) may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs. In still other examples, a slot may have a length measured in bits.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Figure 3:
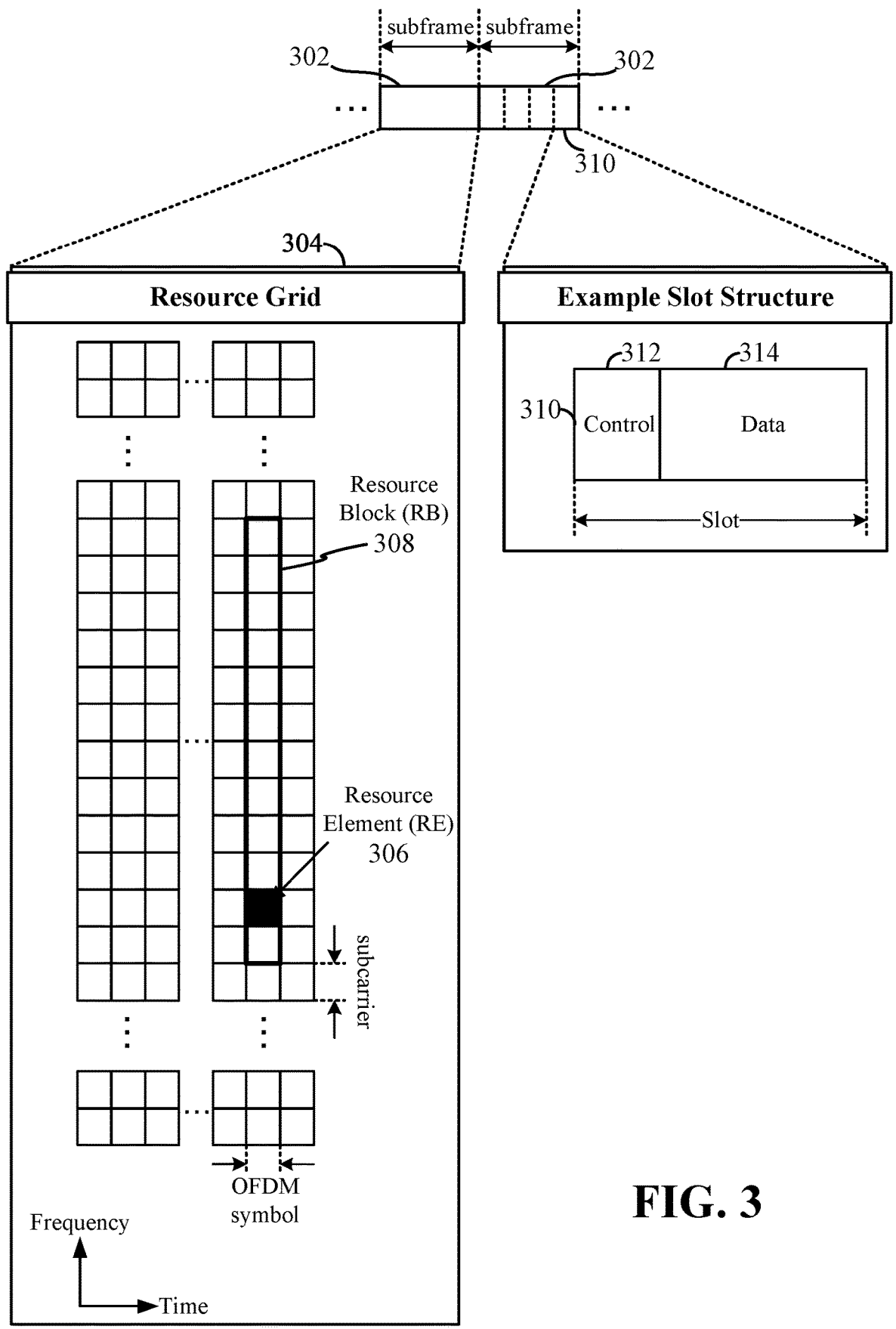
FIG. 3 is a schematic illustration of an organization of wireless resources in an air interface according to some aspects.

The channels or carriers described with respect to the illustrated systems in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels. These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission. Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308. One or more REs 306 (e.g., within the data region 314) may be allocated for user data or traffic data. Such traffic may be carried on one or more traffic channels, such as, for a DL transmission (i.e., transmitting downlink traffic 112), a physical downlink shared channel (PDSCH); or for an UL transmission (i.e., transmitting uplink traffic 116), a physical uplink shared channel (PUSCH). Additionally or alternatively, one or more REs 306 may be allocated for control information encoded by the device transmitting the REs 306, decoded by the receiving device, and used by the receiving device to control subsequent DL/UL transmissions.

In a DL transmission, the transmitting device (e.g., the scheduling entity 108) may allocate one or more REs 306 (e.g., within a control region 312) to carry DCI 114 including one or more DL control channels, such as a physical broadcast channel (PBCH), a physical downlink control channel (PDCCH), a primary synchronization signal (PSS), a secondary synchronization signal (SSS), etc., to one or more scheduled entities 106. A PDCCH may carry downlink control information (DCI) for one or more UEs in a cell. DCI can include, but is not limited to, power control commands, scheduling information, a grant, and/or an assignment of REs for DL and UL transmissions. DCI can include information regarding transmission scheme, UL power control, hybrid automatic repeat request (HARQ) information, and modulation and coding scheme (MCS), and other information. The size and format of the DCI messages can differ depending on the type and amount of information that is carried by the DCI. For example, if spatial multiplexing is supported, the size of the DCI message is large compared to contiguous frequency allocations. Similarly, for a system that employs MIMO, the DCI can include additional signaling information.

DCI size and format can additionally or alternatively depend on hardware and/or network factors such as bandwidth, the number of antenna ports, the duplexing mode, and/or capabilities specific to the scheduled entity 106. For example, DCI may divide or subdivide downlink traffic 112 destined for a reduced-capability UE connected to the base station via the DL; or, the base station may transmit the downlink traffic 112 in the form of packets or other discrete units of data, and DCI may include information for allocating and addressing DL channels (e.g., PDSCH) and/or data streams, and for sequencing and/or multiplexing packet delivery. For example, a base station can create or use DCI to schedule multiple DL data transmissions to be sent in parallel to the UE via multiple PDSCHs distributed across a primary component carrier (PCC) and one or more secondary component carriers (SCC), or distributed via MIMO antenna ports into discrete time/frequency/space resources of the PCC; or, the base station can create or use DCI to schedule sequential DL transmissions (e.g., packets) via a PDCCH or a single PDSCH on a single carrier.

The DCI can include instructions encoded by the scheduling entity 108 and decoded by the scheduled entity 106 to determine parameters for generating and transmitting HARQ feedback. HARQ is a methodology for maintaining data integrity using a combination of known error-checking and error-correcting techniques, specifically forward error correction (FEC) and automatic repeat request (ARQ). Transmitted data includes redundant information used to perform integrity checking, such as an error code used for a cyclic redundancy check (CRC), and to correct a subset of possible errors. If the receiving device determines the data is corrupt (i.e., it does not pass the integrity checking) and irreparable, it generates a "not acknowledged" (NACK) signal as a result of the integrity checking; if the data is intact, the resulting signal is "acknowledged" (ACK). The set of resulting signals for all downlink data is a "HARQ-ACK codebook" containing a series of binary ACK/NACK bits. In response to a NACK, the transmitting device may send a HARQ retransmission, which may ultimately include the transmitting device resending the packet(s) associated with a NACK to the receiving device; the retransmission may implement efficiency methodologies such as chase combining, incremental redundancy, etc., to reduce bandwidth usage for the retransmission.

In an UL transmission, a transmitting device (e.g., a scheduled entity 106) may utilize one or more REs 306 to carry UL control information 118 (UCI). The UCI 118 can originate from one or more UL control channels, such as a physical uplink control channel (PUCCH), a physical random access channel (PRACH), etc., to the scheduling entity 108. In some examples, the UCI 118 may include a scheduling request (SR), i.e., a request for the scheduling entity 108 to schedule uplink transmissions. Here, in response to the SR for UL transmissions, the scheduling entity 108 may transmit DCI 114 that may schedule resource allocation (i.e., on the PUCCH) for uplink packet transmissions. UL control information may also include HARQ feedback such as an acknowledgment (ACK) or negative acknowledgment (NACK), channel state information (CSI), or any other suitable UL control information.

A scheduled entity 106 performs a HARQ integrity check on each received RB individually or in discrete groups, such as code blocks or transport blocks (TBs), and encodes the result of each check, e.g., in a single bit (an "A/N bit") with a value indicating the integrity was either confirmed (ACK) or not confirmed (NACK). The HARQ feedback included in UCI 118 may include the resulting A/N bits. In an example from known telecommunications networks, the A/N bits are concatenated in a sequence, known as a HARQ-ACK codebook, which may be defined in DCI and allows the scheduling entity 108 to associate each A/N bit with a corresponding transport block and to determine which DL transmissions produced a NACK and are to be retransmitted. The HARQ-ACK codebook has a size measured in bits. For example, a dynamic codebook, when the UE is generating one A/N bit per TB, may have a maximum size of K bits, where K is the number of TBs that the scheduled entity 106 should receive, according to DCI. In other examples, the codebook may be even larger than K bits, such as when the codebook is set to a static size K' that is equal to the maximum number of TBs the UE can receive; when K'>K, the UE may generate K'−K NACK bits to fill the required codebook size. These approaches ensure the HARQ-ACK feedback is reliable and "covers" all of the expected TBs, but at a significant resource cost: the UE runs multiple HARQ processes to produce and transmit the HARQ-ACK feedback and to process retransmitted TBs; and, the codebook can occupy a significant portion of the UL payload (e.g., the control region 312 of a slot 310 in a PUCCH transmission).

Figure 4:
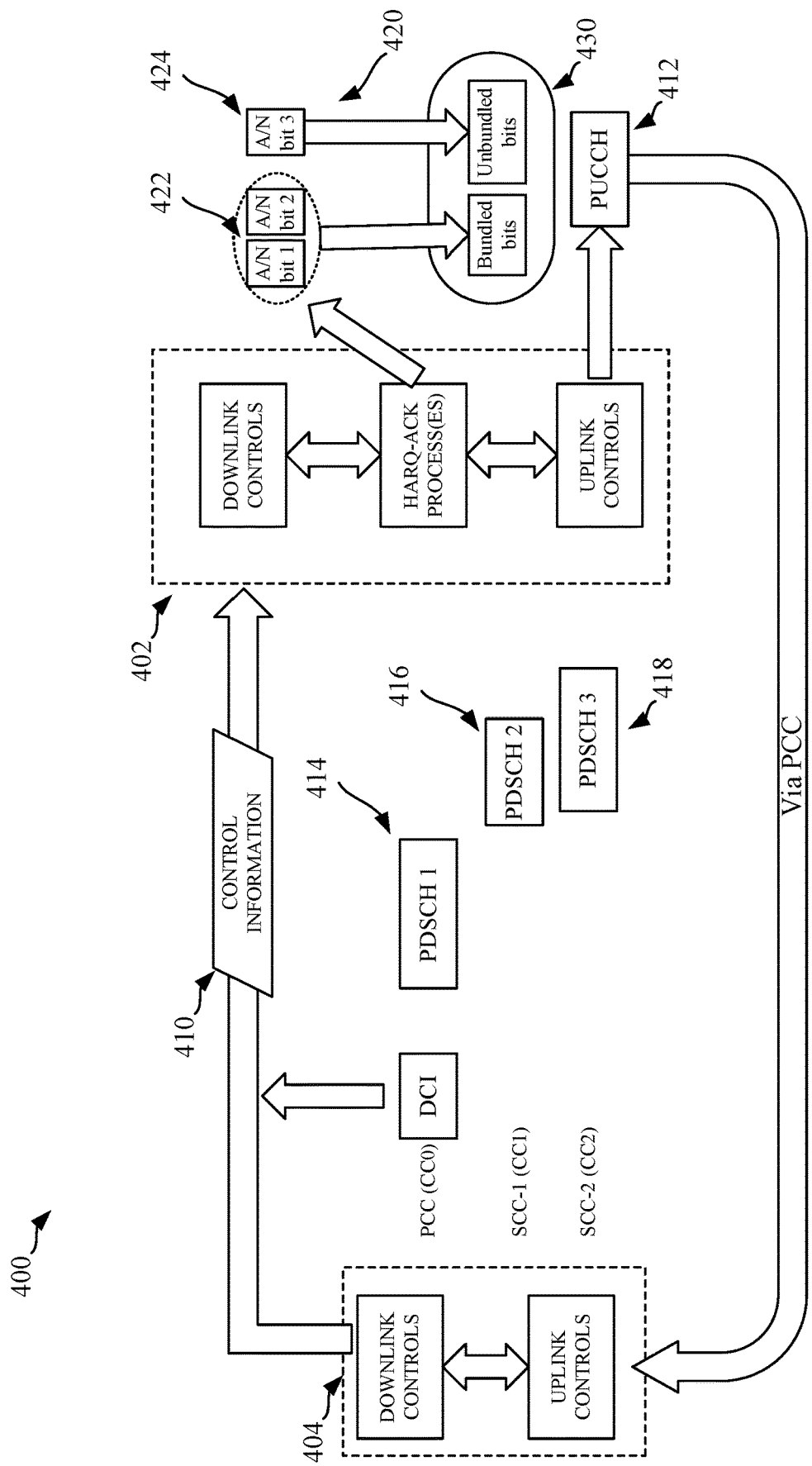
FIG. 4 is a schematic illustration of a wireless network facilitating downlink and uplink communications with a constrained HARQ-ACK codebook according to some aspects of the disclosure.

Referring to FIG. 4, a system 400 as described above with respect to FIGS. 1-3, in which scheduled entities include reduced-capability UEs 402, advantageously simplifies the HARQ-ACK procedure for such UEs 402 while maintaining full coverage and reliability of the integrity checks represented by HARQ-ACK feedback. In particular, the system 400 includes computer-implemented methods, hardware and software apparatuses, and/or computer-readable media for constraining the maximum HARQ-ACK codebook size to N bits, performing HARQ integrity checking on each expected TB to produce a corresponding A/N bit, and compressing a set of size K A/N bits to a set of size N by bundling together some of the resulting A/N bits. The bundling may follow one or more bundling rules intended to render a constrained codebook 430 that nevertheless enables retransmission of every TB that received a NACK and also does not reduce the maximum DL data rate to the UE 402. In particular, one or more bundling rules may instruct the UE how to partition the K A/N bits of the "original" codebook 420 into one or more sets 422 of bits to be bundled together, and optionally also a "set" 424 of one or more bits to not bundle (see below). Non-limiting examples of bundling rules include, but are not limited to: setting the maximum codebook size N; setting the number of bits to bundle; setting the number of bits to leave unbundled; providing search or indexing information for identifying TBs to exclude from bundling; setting the number of bundled sets to generate; setting the number of bits to include in a bundled set; setting the criteria by which the bits are bundled (e.g., TBs are from the same carrier, or received in the same time window, or include one or more resources with the same properties or parameters); etc.

The example of FIG. 4 demonstrates the general features of the present selective HARQ-ACK bundling for reduced-capability UEs in the context of a base station 404 or other scheduling entity (or entities) encoding the HARQ-ACK bundling rules into control information 410 and sending the control information 410 to a reduced-capability UE 402; the UE 402 in turn decodes the control information 410 to determine a HARQ-ACK codebook generation/reduction algorithm that is based at least in part on the bundling rules. The control information 410 can be sent to the UE 402 over a single channel, such as a control or data channel, or can be distributed across multiple channels and/or across multiple downlink communication layers. In one example, the control information 410 can be sent via higher-layer signaling, such as radio resource control (RRC) signaling Additionally or alternatively, some of the control information 410 can be sent via RRC and other elements encoded into DCI. For example, the control information 410 sent via RRC can include the maximum codebook size N, the unbundled set size M, and any other bundling rules, and the control information 410 sent in the DCI can include dynamic priority designations, such as a bit identifying whether each TB is to be bundled or not, as described further herein. In some examples, control information 410 can also include some or all of the scheduling information in the DCI, which is read to determine that the UE 402 should receive K TBs over the downlink from the base station 404.

The K TBs may be delivered in one or more PDSCHs and/or in a PDCCH, and may be multiplexed and delivered in parallel, or serially; if multiplexing to multiple PDSCHs, the PDSCHs may be distributed between a PCC (CC0) and one or more SCCs (e.g., CC1, CC2) as shown, or the PDSCHs may be established through corresponding antenna ports in a MIMO implementation. For clarity, in the illustrated example of FIG. 4, K=3 and each TB is delivered in a corresponding, distinct PDSCH 414, 416, 418. The UE 402 decodes the bundling rules from the control information 410 to determine that the original codebook 420 of size K=3 must be reduced to the constrained codebook 430 of maximum size N=2 (i.e., the UE is granted, or otherwise able to use, resources to transmit only N bits of information, which are insufficient to transmit the K bits required to send the original codebook). In some examples, the bundling rules do not indicate that any of the A/N bits in the original codebook should be excluded from bundling; in another example, the UE 402 decodes the bundling rules from the control information 410 to determine that the A/N bits of the original codebook 420 that correspond to a specific M TBs must be excluded from bundling, and thus will be copied into the constrained codebook 430 with no change in value. Methods and example bundling rules for partitioning the A/N bits in order to identify the set 424 of M unbundled bits and/or to generate more than one set 422 of bundled bits are addressed with respect to the subsequent figures.

Before or after decoding the bundling rules in the control information 410 (e.g., upon receipt of each TB or after receiving all TBs), the UE performs the integrity checking of each TB to generate the corresponding A/N bit as ACK or NACK In one example, the UE produces the A/N bit and then adds the A/N bit to the original codebook 420; over the course of receiving the K TBs (or failing to receive them) and performing the integrity checks, the UE generates an original HARQ-ACK codebook of size≥K. The UE 402 also allocates the resources for sending at least UCI comprising the constrained codebook 430 in the PUCCH 412. Once the UE 402 has completed the integrity checking for all expected TBs, the UE 402 identifies the K−M A/N bits that can be bundled and, using the bundling rules, partitions the bits into one or more sets 422. Thus, the bundling can be performed after completing the integrity checks of all K TBs. In another example, the UE can read the bundling rules to determine how to partition the unbundled bits into bundled sets, and then can begin the integrity checks; as each A/N bit is generated, the UE can check whether the checks are complete for all TBs in any of the bundled sets, and if so, the UE can perform the "bundling" (i.e., compression of corresponding A/N bits into one representative bundled bit of compressed feedback information) on the completed set even before all K TBs have been checked. Additionally, in this example the UE avoids creating an original HARQ-ACK codebook altogether.

The UE 402 then reduces the bits in each set 422 to one bundled bit 432 representing the set, such as by applying a binary AND function to the values of the bits in the set 422—as a result, the bundled bit 432 has a value of ACK only if all of the bits in the set 422 had a value of ACK, otherwise the value of the bundled bit is NACK. After calculating each bundled bit 432, the UE 402 concatenates the bundled bit 432 to the constrained codebook 430. After all bundled sets 422 are reduced, the UE 402 concatenates the remaining M unbundled bits (i.e., uncompressed feedback information) to the constrained codebook 430 to produce a binary sequence of size≤N. In this example the possible compositions of the bits in the constrained codebook 430 include:

[K unbundled bits], size K, if K≤N and codebook size is dynamic;
[K unbundled bits, N−K NACK bits], size N, if K≤N and codebook size is static;
[N−M bundled bits, M unbundled bits] (0≤M≤N−1), size N, if K>N.

The UE 402 stores the constrained codebook 430 in the allocated PUCCH resources as UCI, and transmits the UCI back to the base station 404 via the PUCCH 412.

Upon receipt of the UCI, the base station 404 decodes the UCI to obtain the constrained codebook 430. As the source of the bundling rules and procedures used to generate the constrained codebook 430, the base station 404 can decode the string of N A/N bits to identify 1) the M bits that are in the unbundled set 424, and their sequence, in order to associate the M bits each with the corresponding TB; 2) the N−M bundled bits 432 (i.e., the remaining bits of the constrained codebook 430 that are not one of the M unbundled bits); and, 3) for each bundled bit 432, the set of TBs represented by the bundled bit 432. The base station 404 identifies the TBs represented by any of the bundled bits 432 having a value NACK, and the TB of any of the unbundled bits having a value NACK, and coordinates their retransmission to the UE 402.

Figure 5:
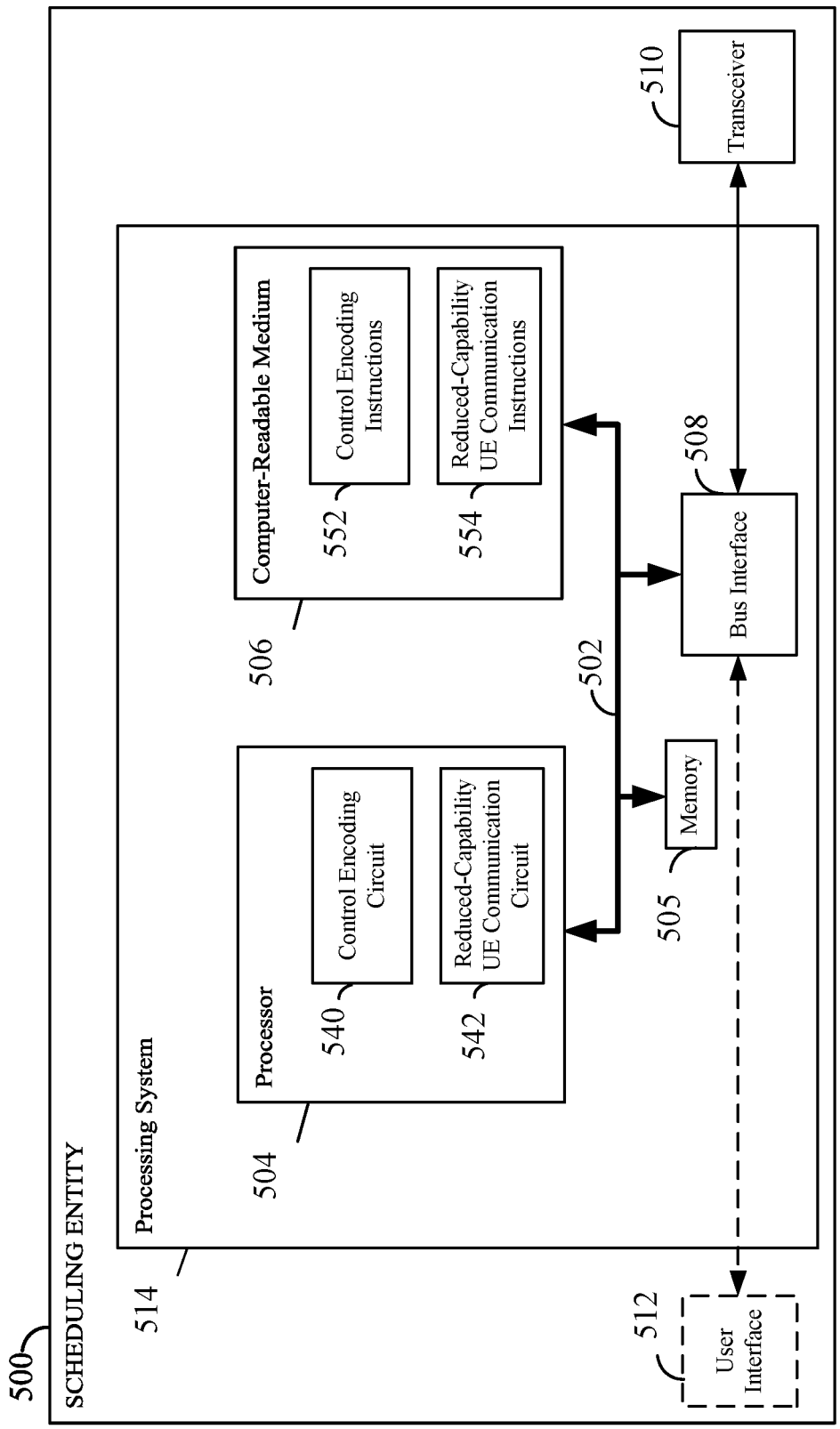
FIG. 5 is a block diagram conceptually illustrating an example of a hardware implementation for a scheduling entity according to some aspects of the disclosure.

FIG. 5 is a block diagram illustrating an example of a hardware implementation for a scheduling entity 500 employing a processing system 514. For example, the scheduling entity 500 may be user equipment (a UE) as illustrated in any one or more of FIGS. 1 and/or 2. In another example, the scheduling entity 500 may be a base station as illustrated in any one or more of FIGS. 1 and/or 2.

The scheduling entity 500 may be implemented with a processing system 514 that includes one or more processors 504. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 500 may be configured to perform any one or more of the functions described herein. That is, the processor 504, as utilized in a scheduling entity 500, may be used to implement any one or more of the processes and procedures described below and illustrated in FIGS. 4 and 7-11.

In this example, the processing system 514 may be implemented with a bus architecture, represented generally by the bus 502. The bus 502 may include any number of interconnecting buses and bridges depending on the specific application of the processing system 514 and the overall design constraints. The bus 502 communicatively couples together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a communication interface or means for communicating with various other apparatus over a transmission medium. Depending upon the nature of the apparatus, a user interface 512 (e.g., keypad, display, speaker, microphone, joystick) may also be provided. Of course, such a user interface 512 is optional, and may be omitted in some examples, such as a base station.

In some aspects of the disclosure, the processor 504 may include control information encoding circuitry 540 configured for various functions, including, for example, configuring and/or transmitting control information. The processor 504 may further include the reduced-capability UE communication circuit 542 configured for various functions, including, for example, communicating with one or more types of reduced-capability UEs, in addition to legacy or other UEs.

The processor 504 is responsible for managing the bus 502 and general processing, including the execution of software stored on the computer-readable medium 506. The software, when executed by the processor 504, causes the processing system 514 to perform the various functions described below for any particular apparatus. The computer-readable medium 506 and the memory 505 may also be used for storing data that is manipulated by the processor 504 when executing software.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may include control information encoding instructions 552 configured for various functions, including, for example, configuring, and/or transmitting control information. The processor 504 may further include reduced-capability UE communication instructions 554 configured for various functions, including, for example, communicating with one or more types of reduced-capability UEs, in addition to legacy or other UEs.

The software may reside on a computer-readable medium 506. The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 6:
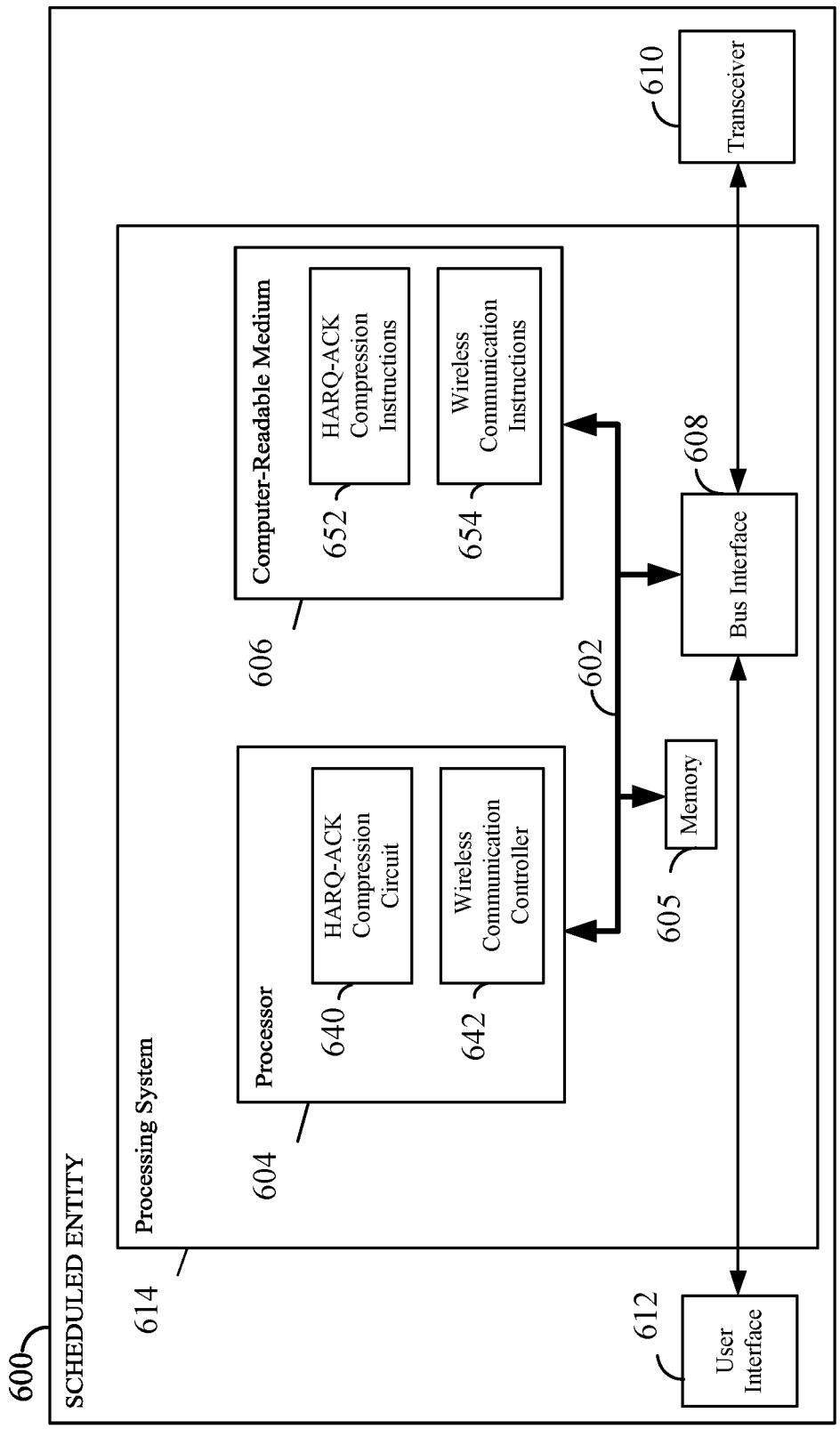
FIG. 6 is a block diagram conceptually illustrating an example of a hardware implementation for a scheduled entity according to some aspects of the disclosure.

FIG. 6 is a conceptual diagram illustrating an example of a hardware implementation for an exemplary scheduled entity 600 employing a processing system 614. In accordance with various aspects of the disclosure, an element, or any portion of an element, or any combination of elements may be implemented with a processing system 614 that includes one or more processors 604. For example, the scheduled entity 600 may be user equipment (a UE) as illustrated in any one or more of FIGS. 1-4. In some examples, the UE 600 may be a reduced-capability UE as described above.

The processing system 614 may be substantially the same as the processing system 514 illustrated in FIG. 5, including a bus interface 608, a bus 602, memory 605, a processor 604, and a computer-readable medium 606. Furthermore, the scheduled entity 600 may include a user interface 612 and a transceiver 610 substantially similar to those described above in FIG. 5. That is, the processor 604, as utilized in a scheduled entity 600, may be used to implement any one or more of the processes described with respect to FIGS. 4 and 7-11.

In some aspects of the disclosure, the processor 604 may include HARQ-ACK compression circuitry 640 configured for various functions, including, for example, decoding portions of DCI, and/or bundling rules, forming sets of A/N bits in the original codebook, and compressing multiple A/N bits into a single representative bit. The processor 604 may further include wireless communication controller 642 configured for various functions, including, for example, wireless communication with a radio access network.

One or more processors 604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may include HARQ-ACK compression instructions 652 configured for various functions, including, for example, decoding portions of DCI and/or bundling rules, forming sets of A/N bits in the original codebook, and compressing multiple A/N bits into a single representative bit. The software may further include wireless communication instructions 654 configured for various functions, including, for example, wireless communication with a radio access network.

The software may reside on a computer-readable medium 606. The computer-readable medium 606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 606 may reside in the processing system 614, external to the processing system 614, or distributed across multiple entities including the processing system 614. The computer-readable medium 606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

UL Payload Reduction for Reduced-Capability Devices

In a network that supports reduced-capability UEs, described above, different reduced-capability UEs can be different device types (e.g., IoT devices, smart wearables, sensors, cameras, etc.), and/or may have different supported bandwidths, carriers and subcarriers and component carriers, channel types and capacities, or other capabilities. Transmission efficiency for any such UE can be improved by reducing UL payload, and one way to reduce the UL payload is to compress or reduce the size of the HARQ-ACK codebook. Using the apparatuses and methods of this disclosure, the HARQ-ACK codebook can be reduced via selective bundling, without compromising the maximum data rate of the UE and without losing the ability to report a successful or unsuccessful receiving and decoding of every TB.

Figure 7:
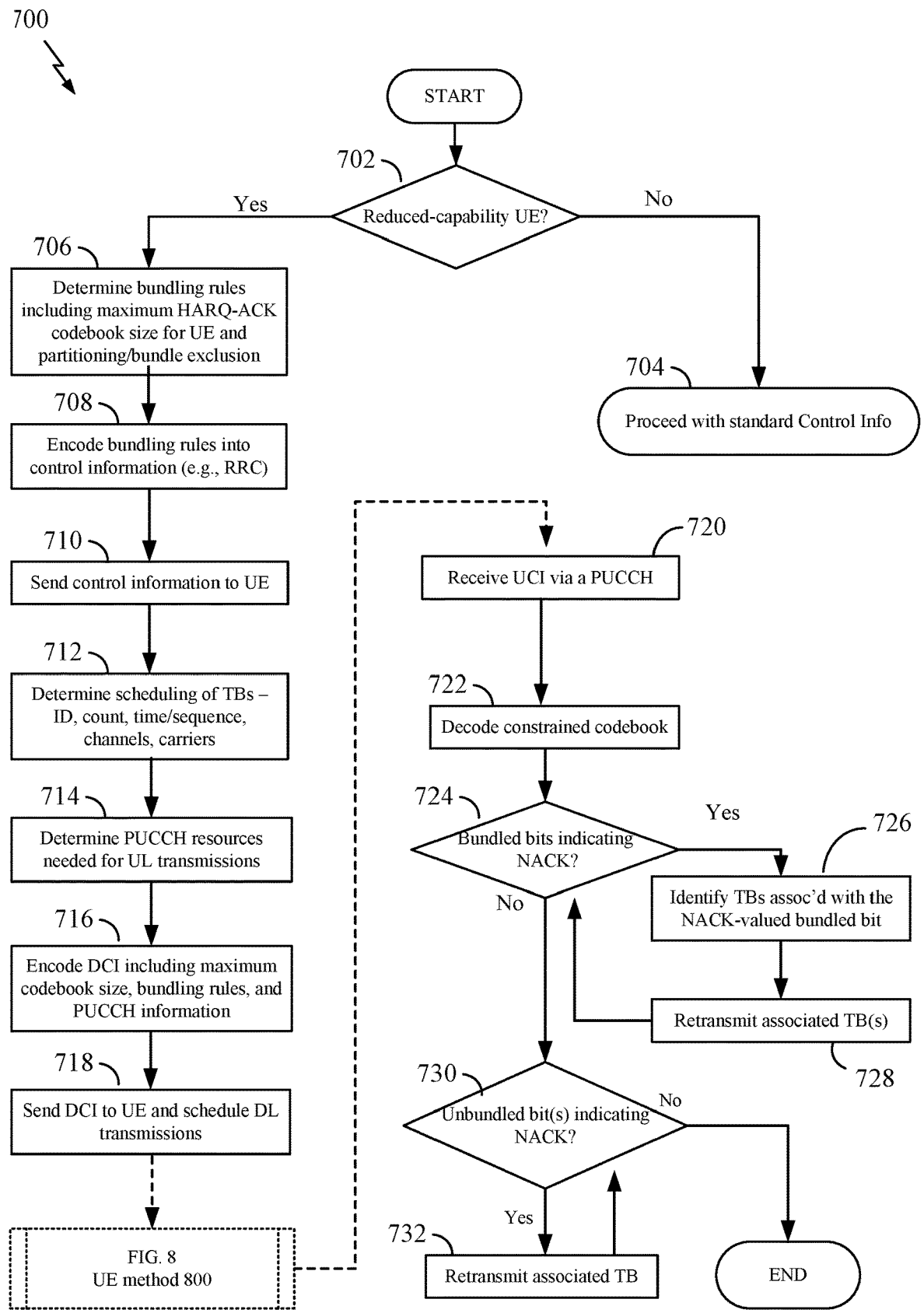
FIG. 7 is a flow chart illustrating an example process for deploying a base station that supports operation with reduced-capability devices according to some aspects of the disclosure.

FIG. 7 is a flowchart that illustrates an exemplary process 700 for a base station or other scheduling entity to enable a UE or other scheduled entity to generate selectively bundled HARQ-ACK information and for the base station to receive such bundled HARQ-ACK information. As described below, some or all illustrated features may be omitted in a particular implementation within the scope of the present disclosure, and some illustrated features may not be required for implementation of all embodiments. In some examples, the scheduling entity or BS 500 illustrated in FIG. 5 may carry out the process 700. In some examples, any suitable apparatus or means for carrying out the functions or algorithm described below may carry out the process 700.

In some examples, the process 700 may be carried out by any suitable apparatus or means for carrying out the functions or algorithm described below. In one example, the process 700 may be performed by a processor such as the processor 504 of the scheduling entity 500, using control circuitry and a communication controller (e.g., the control encoding circuit 540 and the reduced-capability UE communication circuit 542) executing computer-readable instructions (e.g., the control encoding instructions 552 and the reduced-capability UE communication instructions 554) as well as a transceiver (e.g., the transceiver 510) coupled to a processor (e.g., the processor 504).

At block 702, the BS discerns between a legacy UE and a reduced-capability UE on the network. For example, a connected UE that sends a SR, a UE capability information message, or any other suitable message to the scheduling entity may also send identifying information that the scheduling entity uses to identify a UE device type as a reduced capability UE. Additionally, the scheduling entity may discern between unicast and multicast transmissions. For instance if the DL is a unicast DL, the BS may treat the UE as a reduced capability UE. If the UE is a reduced capability UE, the BS proceeds to block 706. Otherwise, the BS proceeds to block 780, as described below (i.e., the BS proceeds by transmitting standard control information rather control information intended for a RedCap UE).

At block 704, the BS treats the UE as a standard (i.e., non-RedCap) UE. For example, the BS may transmit encoding control information for the DL that does not include information related to selective HARQ-ACK bundling.

At block 706, the BS determines (e.g., using a control encoding circuit 540) bundling rules to be used for identifying which A/N bits will not be bundled, how many bundles to make, how to partition A/N bits between sets of bundled and unbundled bits, etc.

At block 708, the BS determines a maximum HARQ-ACK codebook size N for the RedCap UE. For example, the BS may retrieve, from a data store or lookup table in memory (e.g., the memory 505), the corresponding maximum codebook size for the UE's device type, for that specific UE according to the UE's device ID, or by any other suitable algorithm.

At block 710 the BS transmits control information containing or otherwise indicating the bundling rules to the UE. Any suitable means of transmitting the control information may be used including using RRC signaling, as one non-limiting example.

At block 712, the BS determines scheduling of TBs for the DL, including allocation and addressing of PDSCHs on one or more carriers.

At block 714, the BS determines PUCCH resources required for uplink communications (e.g., addressing, data storage requirements, partitioning between control and data spaces, etc.).

At block 716, the BS encodes control information (e.g., as DCI) including previously determined information such as the scheduling information determined at block 712. For example, the BS may include in a DCI, a maximum codebook size N, a number M of unbundled bits, and PUCCH resource allocation. In some examples, the control information can further include further bundling rules, such as a rule for identifying which M bits are to be excluded from bundling. In other examples no additional rules are required (that is, the UE may be preconfigured to store or access the necessary additional bundling rules). In one example, the control information includes the bundling rules (which may be transmitted using RRC signaling in some examples or by any other suitable method), and scheduling information included in DCI.

At block 718, the BS sends control information to UE and schedule DL transmissions (e.g. allocate PDSCHs on a primary component carrier, and in some examples, one or more secondary component carriers). The base station may then transmit DL traffic to the UE according to the network protocols. An example method of the reduced-capability UE generating a constrained HARQ-ACK codebook and encoding it into UCI is described below with respect to FIG. 8. The UE may send UCI back to the scheduling entity via a PUCCH.

The process 700 continues at block 720, where the BS detects receipt of UCI from the UE over the PUCCH.

At block 722, the BS decodes or otherwise extracts HARQ-ACK information formatted according to the constrained HARQ-ACK codebook from UCI.

At block 724, the BS checks the value of each bundled bit and determines whether that bit indicates an ACK or a NACK. For each NACK value corresponding to a bundled feedback bit the BS proceeds to block 730. Once no bundled bits remain to be processed the BS proceeds to block 730.

At block 726, the BS identifies the TBs that are associated with the NACK-valued bit identified at block 724. Each bundled bit indicating a NACK condition indicates one or more of the multiple TBs associated with that bit were not successfully received by the UE. After these TBs are identified the BS proceeds to block 728.

At block 728, the BS retransmits each TB associated the NACK-valued (or NACK-indicating) bundled bit identified at block 724, using any suitable HARQ-ACK processes and returns to block 724.

At block 730, the BS checks for an unbundled feedback bit. If the bit indicates a NACK, the BS proceeds to block 732. For each unbundled bit indicating a NACK, the BS proceeds to block 732. If no unbundled bits indicating a NACK condition remain, the process 700 ends.

At block 732, the BS retransmits the associated TB for which an unbundled feedback bit indicating a NACK condition was received.

Figure 8:
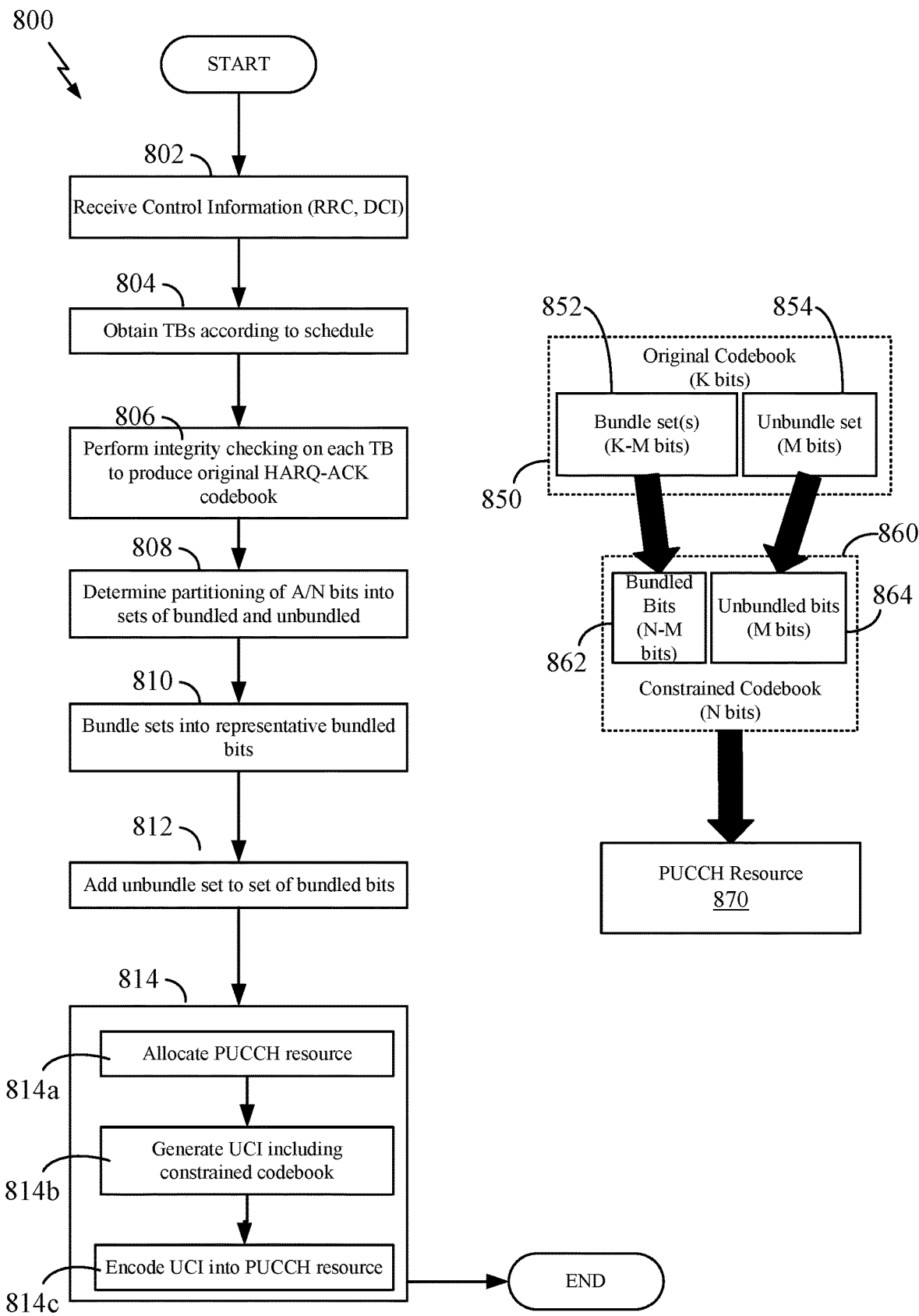
FIG. 8 is a flow chart illustrating an example process for deploying a reduced-capability device according to some aspects of the disclosure.

FIG. 8 is a flowchart that illustrates an example process 800 for a UE or other scheduled entity to enable a UE or other scheduled entity to generate selectively bundled HARQ-ACK information, transforming information formatted according to an original codebook 850 into information formatting according to a constrained codebook 860. As described below, some or all illustrated features may be omitted in a particular implementation within the scope of the present disclosure, and some illustrated features may not be required for implementation of all embodiments. In some examples, the scheduling entity or UE 600 illustrated in FIG. 6 may carry out the process 800. In some examples, any suitable apparatus or means for carrying out the functions or algorithm described below may carry out the process 800.

In some examples, the process 800 may be carried out by any suitable apparatus or means for carrying out the functions or algorithm described below. In one example, the process 800 may be performed by a processor such as the processor 604 of the scheduled entity 600 (e.g., a UE), using HARQ-ACK compression circuitry and communication controller (e.g., the HARQ-ACK compression circuit 640 and the wireless communication circuit 642) executing computer-readable instructions (e.g., the HARQ-ACK compression instructions 652 and the wireless communication instructions 654) as well as a transceiver (e.g., the transceiver 610) coupled to a processor (e.g., the processor 604).

At block 802, the UE receives control information required to implement selective bundling (i.e., compression) of HARQ-ACK feedback. The control information includes information necessary to identify which HARQ-ACK feedback should be bundled and which HARQ-ACK feedback should not be bundled (e.g., the DCI encoded at block 716 of the process 700). In some examples, the control information also includes separate rules (e.g., the bundling rules encoded at block 708 of the process 700) which may be signaled separately via RRC signaling or any other acceptable mechanism. In some examples, the UE may configured to access pre-configured bundling rules stored in memory (e.g., the memory 605).

In some examples, the control information may explicitly specify which HARQ-ACK bits to bundle (i.e., compress). For instance, each DCI scheduling a transport block (TB) may include a bit that indicates whether HARQ-ACK feedback for that block should be bundled with HARQ-ACK feedback for other blocks, or whether the HARQ-ACK feedback for that TB should not be combined with other feedback via bundling or any other compression method.

At block 804, the UE uses the scheduling information to obtain (i.e., receive and decode) K TBs scheduled by the DCI received at block 802.

At block 806, the UE, while obtaining the TBs, performs integrity checking of TBs to produce an original HARQ-ACK codebook 850 of size K bits using any suitable HARQ-ACK process. For purposes of illustration, it will be assumed that the UE is configured to use a HARQ-ACK process that assigns a single bit indicated and 'ACK' value or a 'NACK' value to each TB At block 808, the UE, based on the bundling rules for the UE (e.g., bundling rules received in the control information, predetermined bundling rules, etc.), determines a partition of the original codebook 850 into at least one bundle set 852 (if K>N, see FIG. 9 and below) and an unbundle set 854; for example, if the unbundle set 854 is prescribed to have M bits, and M=N−1, there is one bundle set At block 852 containing the K−M bits that are not in the unbundle set 854. The bundling rules can indicate that a single bundle set 852 or multiple bundle sets 852 are to be formed; if there are to be multiple bundle sets 852, the bundling rules can further indicate the criteria (e.g., being received or scheduled within the same time window, or from the same base station or component carrier, or possessing the same value of another shared property) for determining which of the bundle sets 852 each A/N bit should be assigned to.

At block 810, the UE bundles the K−M bits of the bundle set(s) 852 into a bundled set 862 of N−M bundled bits in the constrained codebook 860; for example, the values of the A/N bits within a bundle set 852, e.g., being 0 for NACK and 1 for ACK, may be combined using a binary AND operation to produce the value of the representative bundled bit, so that the value of the bundled bit is NACK unless all of the bits in the set 852 are ACK. In one example, the K−M bits can be assigned to a single bundle set 852, and the UE can apply a joint compression algorithm (which may be specified in the bundling rules, or stored in memory) to the bits in the bundle set 852 to produce the N−M bundled bits (M≤N−1)

At block 812, the UE copies the set 854 of unbundled M bits into the constrained codebook 860; for example, the UE may concatenate the bundled N−M bits with the unbundled M bits to produce the final constrained codebook 860 of size N bits. At block 814, which includes the blocks 814a, 814b, and 814c, the UE transmits the constrained codebook 860 in a PUCCH resource 870. At block 814a, the UE determines, from DCI (e.g., a DCI received at block 802), details of the allocation of the PUCCH resource 870. At block 814b, the UE generates UCI including the constrained codebook 860. At block 814c, the UE encodes the UCI into a control space of a slot in the PUCCH resource 870.

The UE subsequently receives the retransmission of any TBs that did not pass the integrity checking, and may perform the process 800 or a similar integrity checking and HARQ-ACK process on the retransmitted TBs.

Priority, Bundling Exclusion, and Partitioning of Original Codebook Bits

There are several reasons why selective HARQ-ACK bundling may be desirable. One reason is to ensure that a maximum amount of resources (e.g., in a slot as described above with respect to FIG. 3) can, if available, be allocated to the DL for transmitting and retransmitting (i.e., in response to a NACK) the TBs, in turn maximizing the data transfer rate/throughput that the reduced-capability UE 402 could achieve over the DL. For instance, the UE may be able to support K data streams (e.g., on a PDCCH and/or one or more PDSCHs), but may only be able to allocate N bits of a PUCCH resource to send HARQ-ACK feedback to the scheduling entity. Selective bundling provides an efficient HARQ-ACK resolution by compressing the original codebook to fit in the available resources, i.e., to maximum size N. Thus, the original codebook's K−M bundle-eligible A/N bits can be partitioned into to N−M sets, 0≤M<N, and, taking all bundling rules into account (see below), the sets can contain as few bits as possible to reduce or minimize the retransmission of TBs that actually passed the integrity checks.

There are also reasons to selectively exclude certain A/N bits, or a certain number of A/N bits, in the original codebook from the bundle sets and instead add those bits to the constrained codebook unchanged. For example, the set of unbundled bits in the constrained codebook can provide the scheduling entity with "one-to-one" resolution of the integrity of TBs transmitted on important or high-priority PDSCHs; those TBs, if associated with a NACK, can then be retransmitted as promptly as possible, and also those TBs, if associated with an ACK, do not get retransmitted (as they might if the A/N bits are included in a bundle). In another example, K may only intermittently exceed N, and/or may typically exceed N by a small amount, and M may efficiently be set to N−1 so that M data streams have one-to-one HARQ-ACK resolution and the few and/or sporadic excess (i.e., K−N) A/N bits are bundled into just one bundle set to minimize bundling overhead.

"Bundling rules" for selective partitioning of the original codebook and reduction to a constrained codebook that satisfies HARQ-ACK resolution requirements as described above can be agreed-upon by the network entities and integrated into network protocols, standards, formats, etc. One, some, or all of the bundling rules can be encoded into the DCI by the base station, or accessed or stored (e.g., in firmware or memory) by the UE, or hard-coded into prescribed metadata or control information for reduced-capability UEs, or some combination of the preceding. The predetermined bundling rules and instructions and parameter-value pairs in the DCI ensure that the scheduling entity and the scheduled entity are in agreement on which TBs, channels, data streams, carriers, and/or other resources are represented by each bit in the constrained codebook. Non-limiting examples of selectively partitioning the HARQ-ACK original codebook based on bundling rules are described below with respect to FIGS. 9-11.

Figure 9:
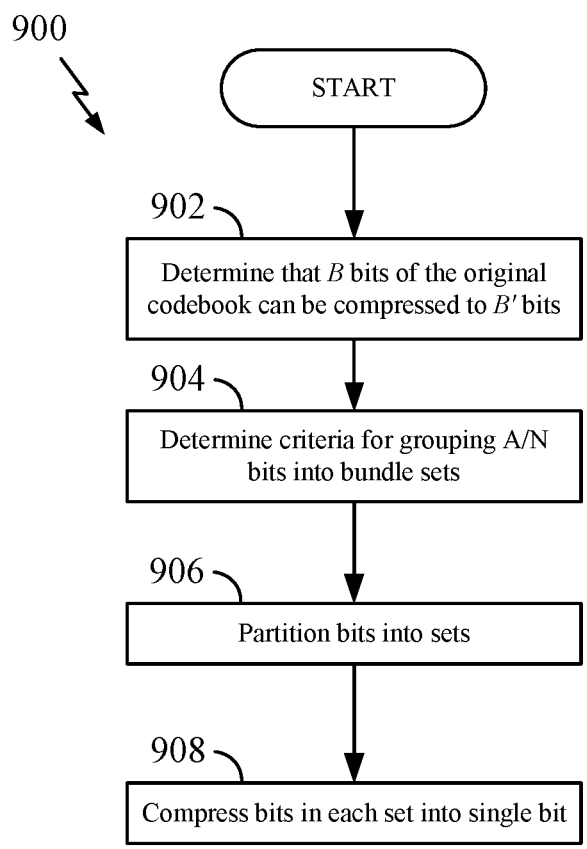
FIG. 9 is a flow chart illustrating an example process for compressing a plurality of sets of bits in an original HARQ-ACK codebook into a plurality of bits in a constrained HARQ-ACK codebook according to some aspects of the disclosure.

FIG. 9 is a flowchart that illustrates an exemplary process 900 for a UE or other scheduled entity to enable a UE or other scheduled entity to using one or more bundling rules to partition a plurality of A/N bits into a plurality of bundle sets (i.e., compressed HARQ-ACK information). As described below, some or all illustrated features may be omitted in a particular implementation within the scope of the present disclosure, and some illustrated features may not be required for implementation of all embodiments. In some examples, the scheduling entity or UE 600 illustrated in FIG. 6 may carry out the process 900. In some examples, any suitable apparatus or means for carrying out the functions or algorithm described below may carry out the process 900.

In some examples, the process 900 may be carried out by any suitable apparatus or means for carrying out the functions or algorithm described below. In one example, the process 900 may be performed by a processor such as the processor 604 of the scheduled entity 600 (e.g., a UE), using HARQ-ACK compression circuitry and communication controller (e.g., the HARQ-ACK compression circuit 640 and the wireless communication circuit 642) executing computer-readable instructions (e.g., the HARQ-ACK compression instructions 652 and the wireless communication instructions 654) as well as a transceiver (e.g., the transceiver 610) coupled to a processor (e.g., the processor 604).

At block 902, the UE determines that B bits of the original codebook can be compressed to B' bits; for example, bundling rule(s) may specify, for the UE, a maximum codebook size N and an unbundled set size M≤N−2. The base station or UE may determine, based on a DL capacity of K data streams, that B=K−M and B'=N−M.

At block 904, the UE determines criteria for grouping the B bits into B' sets; for example, bundling rule(s) may specify that the B bits are to be grouped by a shared property of the associated TBs' delivery to the UE. Non-limiting example criteria include, the UE TBs received on the same carrier; corresponding PDSCHs received or scheduled in the same predefined time window; corresponding control information or traffic data (e.g., packets) use or address a resource with the same property, etc.

At block 906, the UE partitions the B bits into the corresponding B' sets; for example, bundling rule(s) may specify that the bits should be bundled according to the sequence of receipt, and should be even distributed among the sets, so the UE groups each B/B' sequential bits into a corresponding set.

At block 908, the UE compresses the B bits into B' bits; for example, the UE may apply a binary AND to the example groups of block 906 above to produce the B' bits for the constrained codebook.

Figure 10:
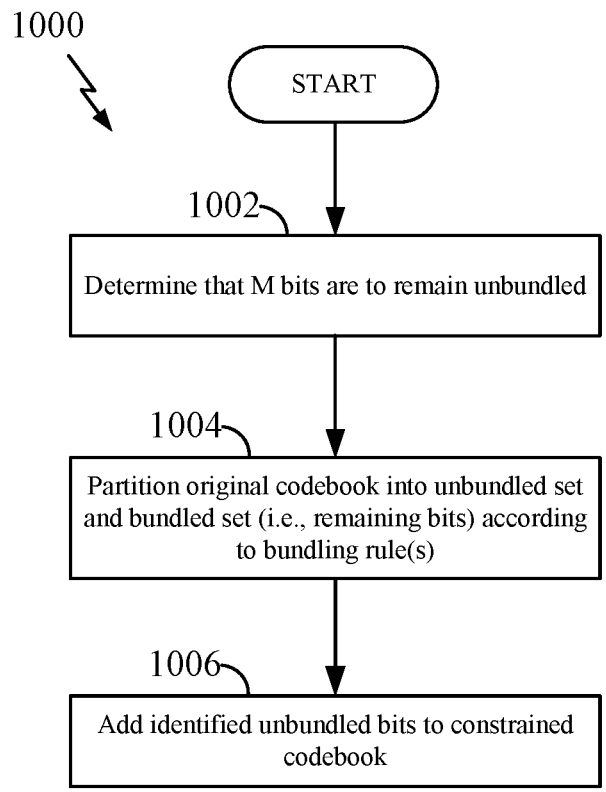
FIG. 10 is a flow chart illustrating an example process for partitioning an original HARQ-ACK codebook into bundled and unbundled sets for a constrained HARQ-ACK codebook according to some aspects of the disclosure.

FIG. 10 is a flowchart that illustrates an exemplary process 1000 that enables a UE or other scheduled entity to partition the original codebook between the bits that can be bundled (e.g., into a single bundle or into multiple bundles according to process 900) and the bits that are to remain unbundled, based on predefined bundling rules or a procedure specified by predefined bundling rules. As described below, some or all illustrated features may be omitted in a particular implementation within the scope of the present disclosure, and some illustrated features may not be required for implementation of all embodiments. In some examples, the scheduling entity or UE 600 illustrated in FIG. 6 may carry out the process 1000. In some examples, any suitable apparatus or means for carrying out the functions or algorithm described below may carry out the process 1000.

In some examples, the process 1000 may be carried out by any suitable apparatus or means for carrying out the functions or algorithm described below. In one example, the process 1000 may be performed by a processor such as the processor 604 of the scheduled entity 600 (e.g., a UE), using HARQ-ACK compression circuitry and communication controller (e.g., the HARQ-ACK compression circuit 640 and the wireless communication circuit 642) executing computer-readable instructions (e.g., the HARQ-ACK compression instructions 652 and the wireless communication instructions 654) as well as a transceiver (e.g., the transceiver 610) coupled to a processor (e.g., the processor 604).

At block 1002, the UE Determine that the unbundled set contains M bits of the original codebook (the bundled set(s) therefore contain a total of K−M bits); for example, control information may specify the set size M.

At block 1004, the UE Partition the original codebook into the unbundled set of M bits and the remaining set of K−M bits according to a bundling rule. In one example, the bundling rule may specify that the A/N bits associated with the M most recently received PDSCHs will be unbundled, and the UE may identify the last M bits of the original codebook as belonging to the unbundled set. In another example, the bundling rule may specify that the A/N bits associated with the M most recently scheduled PDSCHs will be unbundled, and the UE may identify the M bits of the original codebook that are associated with these PDSCHs as belonging to the unbundled set; the scheduling entity will identify the corresponding PDSCHs based on the scheduling information it created.

At block 1006, the UE Copy the values of the identified bits from the original codebook into the constrained codebook; for example, the UE may extract the M bits, retaining their sequence, and concatenate them to the bundled bits (i.e., generated in process 900).

Figure 11:
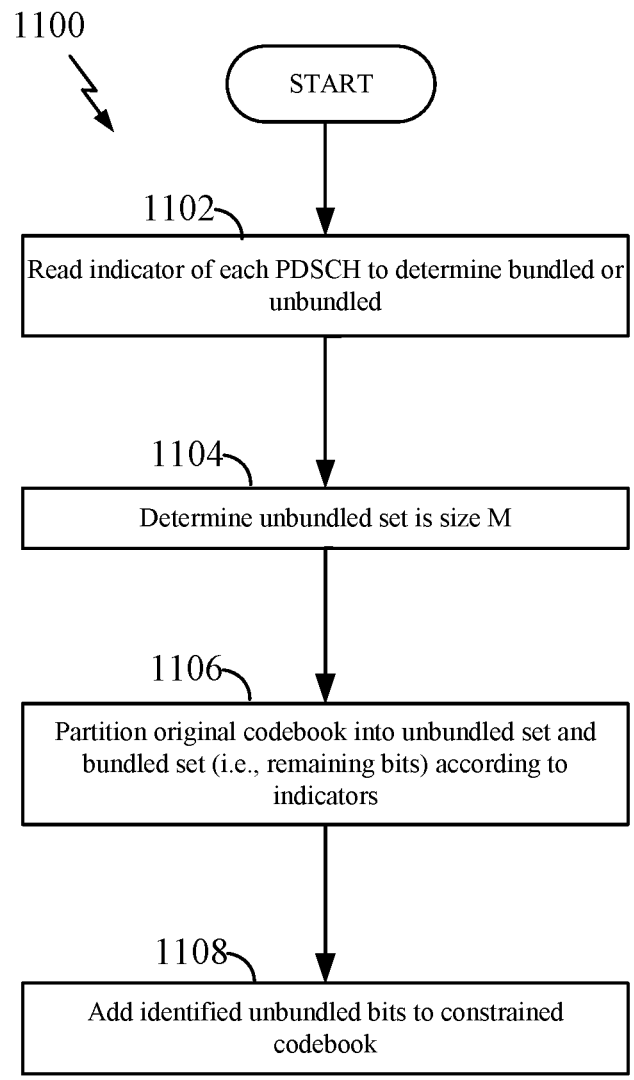
FIG. 11 is a flow chart illustrating another example process for partitioning an original HARQ-ACK codebook into bundled and unbundled sets for a constrained HARQ-ACK codebook according to some aspects of the disclosure.

FIG. 11 is a flowchart that illustrates another example process 1100 for a UE or other scheduled entity to partition an original codebook between the bits that can be compressed (e.g., bundled into a single bundle or into multiple bundles according to process 900) and the bits that are to remain uncompressed (unbundled), based on a dynamic, resource-based indicator that the UE is configured to read. As described below, some or all illustrated features may be omitted in a particular implementation within the scope of the present disclosure, and some illustrated features may not be required for implementation of all embodiments. In some examples, the scheduling entity or UE 600 illustrated in FIG. 6 may carry out the process 1100. In some examples, any suitable apparatus or means for carrying out the functions or algorithm described below may carry out the process 1100.

In some examples, the process 1100 may be carried out by any suitable apparatus or means for carrying out the functions or algorithm described below. In one example, the process 1000 may be performed by a processor such as the processor 604 of the scheduled entity 600 (e.g., a UE), using HARQ-ACK compression circuitry and communication controller (e.g., the HARQ-ACK compression circuit 640 and the wireless communication circuit 642) executing computer-readable instructions (e.g., the HARQ-ACK compression instructions 652 and the wireless communication instructions 654) as well as a transceiver (e.g., the transceiver 610) coupled to a processor (e.g., the processor 604).

At block 1102, for each PDSCH, the UE reads the corresponding indicator to determine if the A/N bit for the PDSCH is to be bundled or not bundled. In one example, DCI may include a flag bit for each scheduled PDSCH, with a binary value indicating whether the corresponding A/N bit is part of the unbundled set or not; relative to existing DCI format standardization, the flag bit may be a new bit added to control information for each scheduled PDSCH, or a bit that is already defined in the DCI format, such as the "priority indicator" bit introduced in DCI format 1.2, can be repurposed as the flag bit.

At block 1104, the UE determines that the unbundled set contains M bits of the original codebook (the bundled set(s) therefore contain a total of K−M bits); for example, the UE may keep a count of the PDSCH flag bits that indicate unbundled bit, or M may be defined in RRC or DCI.

At block 1106, the UE partitions the original codebook into the unbundled set of M bits (i.e., uncompressed feedback information) and the remaining set of K–M bits (i.e., uncompressed feedback information) according to the read indicators.

At block 1108, the UE copies the values of the identified unbundled bits from original codebook into the constrained codebook as described above with respect to FIG. 10.

Aspects of the disclosure relate to various apparatus, methods, and computer-readable media for managing HARQ-ACK processes. Some deployments can be utilized for reduced-capability wireless user equipment (UEs) as well as many other communication devices. In one example, a wireless base station may transmit downlink control information (DCI) including scheduling information for downlink (DL) channels and/or data streams to a UE. Additionally or alternatively, a base station (BS) may further transmit bundling rules for selectively compressing an original HARQ-ACK codebook. One particular approach includes compressing a codebook of size K into a constrained HARQ-ACK codebook of size N<K that the UE has been granted resources to send (i.e., the UE is granted, or otherwise able to use, resources to transmit only N bits of information, which are insufficient to transmit the K bits required to send the original uncompressed codebook).

Bundling rules can include the maximum codebook size N, a number M of bits that should not be bundled, criteria for bundling a plurality of the K–M bits into N–M bits, etc. In some scenarios, a UE can AND together bundled ACK/NACK bits to produce bundled information (e.g., one or more representative bundled bits of compressed feedback information). A base station can identify and schedule retransmission of packets associated with all of a bundled set of A/N bits if their representative bundled bit is NACK.

In some examples, a UE may receive the maximum codebook size N corresponding to a set of PDSCH transmissions (e.g., a set of TBs) and determine, from the codebook size N, that a number of bits required to transmit an A/N for each transmission (i.e., the value K) is greater than the maximum codebook size N. The UE may then determine how many bits of HARQ-ACK feedback should be compressed (e.g., using bundling) in response to receiving the maximum codebook size N that indicates that indicates that the amount of feedback information allowed for sending HARQ-ACK feedback for the PDSCH transmissions is insufficient to transmit all the feedback information without using compression.

It will be understood that examples herein represent improvements over previous methods and devices which may be configured to transmit either bundled or unbundled HARQ-ACK feedback for different messages (e.g., distinct sets of PDSCH transmissions comprising multiple TBs). In particular, HARQ-ACK feedback for single messages (e.g., a particular set of consecutive TBs received via PDSCH transmissions) may be transmitted as a combination of bundled and unbundled feedback information according to bundling rules which may be configured to ensure (or increase the likelihood) that feedback corresponding to prioritized portions of a message is sent in uncompressed (i.e., unbundled) form when there are too many portions of the designated message (e.g., a designated set of TBs) for HARQ-ACK feedback to be transmitted without the use of compression such as bundling.

Further Examples Having A Variety of Features

Example 1: A wireless communication apparatus, method, device, system, equipment, and/or article of manufacture for wireless communication. This example includes receiving, via a transceiver, multiple downlink transmissions carrying a downlink message. This example further includes receiving, via the transceiver, information indicating that an amount of feedback information allowed for a feedback transmission is insufficient to transmit feedback information indicating whether the multiple downlink transmissions forming the downlink message were successfully decoded.

This example further includes transmitting, via the transceiver, compressed feedback information and uncompressed feedback information. The compressed feedback information is a first portion of the feedback information in compressed form and the uncompressed feedback information is the second portion of the feedback information that is different from the first portion of the feedback information Example 2: The wireless communication apparatus, method, device, system, equipment, and/or article of manufacture of example 1, further including transmitting feedback information corresponding to a first portion of the downlink message as the compressed feedback information, and transmitting feedback information corresponding to a second portion of the downlink message received after the first portion of the downlink message as the uncompressed feedback information.

Example 3: The wireless communication apparatus, method, device, system, equipment, and/or article of manufacture of example 1, further including receiving second control information after first control information. The example further includes transmitting feedback information corresponding to a first portion of the downlink message carried by downlink transmissions scheduled using the first control information as the compressed feedback information. The example further includes transmitting feedback information corresponding to a second portion of the downlink message scheduled using the second control information as the uncompressed feedback information.

Example 4: The wireless communication apparatus, method, device, system, equipment, and/or article of manufacture of example 1, further including receiving, via the transceiver, for each downlink transmission, control information indicating whether feedback information corresponding to a portion of the downlink message carried by that downlink transmission is to be compressed.

Example 5: The wireless communication apparatus, method, device, system, equipment, and/or article of manufacture of example 1, wherein the downlink transmissions comprise physical downlink shared channel (PDSCH) transmission. In this example, the compressed feedback information comprises one or more bundled bits of HARQ/ACK information. Each bundled bit of HARQ-ACK information corresponds to a set of two or more PDSCH transmissions and indicates whether every PDSCH transmission corresponding to that bundled HARQ-ACK bit was successfully decoded, or that one or more of the PDSCH transmissions corresponding to that bundled HARQ-ACK bit was not successfully decoded.

Example 6: The wireless communication apparatus, method, device, system, equipment, and/or article of manufacture of example 5, further including receiving, via the transceiver, a respective downlink control information (DCI) transmission for each PDSCH transmission. Each respective DCI transmission contains a respective priority indicator for that PDSCH. This example also includes transmitting, in the compressed feedback information, HARQ-ACK information corresponding to PDSCH transmissions associated with DCI transmissions that include a first priority indicator value. This example also includes transmitting, in the uncompressed feedback information, HARQ-ACK information corresponding to PDSCH transmissions associated with DCI transmissions that include a second priority indicator value different from the first priority indicator value.

Example 7: The wireless communication apparatus, method, device, system, equipment, and/or article of manufacture of example 1, further including receiving an unbundled hybrid automatic repeat request acknowledgement (HARQ-ACK) codebook size M and a maximum (HARQ-ACK) codebook size N via the transceiver. This example also includes transmitting M bits of the feedback information as the uncompressed feedback information and transmitting N–M bits as the compressed feedback information.

Example 8: The wireless communication apparatus, method, device, system, equipment, and/or article of manufacture of example 7, further including receiving the unbundled HARQ-ACK codebook size M via the transceiver using radio resource control (RRC) signaling.

Example 9: The wireless communication apparatus, method, device, system, equipment, and/or article of manufacture of example 8, further including receiving the maximum (HARQ-ACK) codebook size N via the transceiver using RRC signaling.

Example 10: A wireless communication apparatus, method, device, system, equipment, and/or article of manufacture for wireless communication. This example includes transmitting multiple downlink transmissions forming a downlink message to user equipment (a UE) via a transceiver. This example also includes transmitting control information associated with the set of downlink transmissions via the transceiver. The control information indicates that a base station is configured to receive an allowed amount of feedback information indicating whether the downlink message was successfully decoded by the UE.

This example also includes receiving, as the feedback information, compressed feedback information and uncompressed feedback information via the transceiver. The compressed feedback information is a first portion of the feedback information in compressed form and indicates whether a first portion of the downlink message was successfully decoded by the UE. The uncompressed feedback information is a second portion of the feedback information different from the first portion of the feedback information and indicates whether a second portion of the downlink message that differs from the first portion of the downlink message was successfully received by the UE.

Example 11: The wireless communication apparatus, method, device, system, equipment, and/or article of manufacture of example 10, further including receiving feedback information corresponding to a first portion of the downlink transmissions as the compressed feedback information. This example also includes receiving feedback information corresponding to a second portion of the downlink transmissions transmitted after the first portion of the downlink transmissions as the uncompressed feedback information.

Example 12: The wireless communication apparatus, method, device, system, equipment, and/or article of manufacture of example 10, further including transmitting first control information to the UE via the transceiver. The first control information contains scheduling information for a first portion of the downlink transmissions. This example also includes transmitting second control information to the UE via the transceiver after transmitting the first control information. The second control information contains scheduling information for a second portion of the downlink transmissions. This example also includes receiving feedback information corresponding to the first portion of the downlink transmissions as the compressed feedback information, and also includes receiving feedback information corresponding to the second portion of the downlink transmissions as the uncompressed feedback information.

Example 13: The wireless communication apparatus, method, device, system, equipment, and/or article of manufacture of example 10, in which the downlink transmissions include physical downlink shared channel (PDSCH) transmissions. This example includes transmitting, via the transceiver, a respective downlink control information (DCI) transmission for each PDSCH transmission. Each respective DCI transmission contains a respective priority indicator for that PDSCH. This example also includes receiving HARQ-ACK information corresponding to PDSCH transmissions associated with DCI transmissions that include a first priority indicator value as the compressed feedback information. This example also includes receiving HARQ-ACK information corresponding to PDSCH transmissions associated with DCI transmissions that include a second priority indicator value different from the first priority indicator value as the uncompressed feedback information.

Example 14: The wireless communication apparatus, method, device, system, equipment, and/or article of manufacture of example 10, further including transmitting, to the UE device, an unbundled hybrid automatic repeat request acknowledgement (HARQ-ACK) codebook size M and a maximum (HARQ-ACK) codebook size N via the transceiver. The uncompressed feedback information has a size of M bits of information and the compressed feedback information has a size of N–M bits information Example 15: The wireless communication apparatus, method, device, system, equipment, and/or article of manufacture of example 14, further including transmitting the unbundled HARQ-ACK codebook size M via radio resource control (RRC) signaling.

Several aspects of a wireless communication network have been presented with reference to an exemplary implementation. As those skilled in the art will readily appreciate, various aspects described throughout this disclosure may be extended to other telecommunication systems, network architectures, and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects.

For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features, and/or functions illustrated in FIGS. 1-11 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1-11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

What is claimed is:

1. A wireless communication device operable as user equipment (a UE), comprising:
   one or more processors;
   one or more transceivers coupled to the one or more processors; and
   one or more memories coupled to the one or more processors, wherein the one or more processors are individually or collectively configured to cause the wireless communication device to:
      receive, via the one or more transceivers, an unbundled hybrid automatic repeat request acknowledgement (HARQ-ACK) codebook size M and a maximum HARQ-ACK codebook size N, wherein N is greater than M;
      receive, via the one or more transceivers, K downlink transmissions forming a downlink message, wherein K is greater than N;
      transmit, via the one or more transceivers, N-M bits of compressed feedback information for K-M of the K downlink transmissions, wherein the compressed feedback information that is a first portion of feedback information in compressed form, the feedback information indicating whether the K downlink transmissions were successfully decoded by the UE; and
      transmit, via the one or more transceivers, M bits of uncompressed feedback information for M of the K downlink transmissions using an unbundled HARQ-ACK codebook, wherein the uncompressed feedback information is a second portion of the feedback information that is different from the first portion of the feedback information.

2. The wireless communication device of claim 1, wherein the one or more processors are further individually or collectively configured to cause the wireless communication device to:
   transmit, via the one or more transceivers, the NM bits of compressed feedback information corresponding to a first portion of the downlink message; and
   transmit, via the one or more transceivers, the M bits of uncompressed feedback information corresponding to a second portion of the downlink message received after the first portion of the downlink message.

3. The wireless communication device of claim 1, wherein the one or more processors are further individually or collectively configured to cause the wireless communication device to:
   transmit, via the one or more transceivers, the N-M bits of compressed feedback information corresponding to a first portion of the downlink message carried by downlink transmissions scheduled using first control information; and
   transmit, via, the one or more transceivers, the M bits of uncompressed feedback information corresponding to a second portion of the downlink message scheduled using second control information,
   wherein the second control information is received after the first control information.

4. The wireless communication device of claim 1, wherein the one or more processors are individually or collectively further configured to cause the wireless communication device to:
   receive, via, the one or more transceivers, for each downlink transmission of the K downlink transmissions, control information indicating whether feedback information corresponding to a portion of the downlink message carried by that downlink transmission is to be compressed.

5. The wireless communication device of claim 1, wherein the K downlink transmissions comprise physical downlink shared channel (PDSCH) transmissions; and wherein the N-M bits of compressed feedback information comprises comprise bundled bits of HARQ-ACK information, each bundled bit of HARQ-ACK information corresponding to a set of two or more corresponding PDSCH transmissions that indicates whether every PDSCH transmission corresponding to that bundled bit of HARQ-ACK was successfully decoded or that one or more of the PDSCH transmissions corresponding to that bundled bit of HARQ-ACK information was not successfully decoded.

6. The wireless communication device of claim 5, wherein the one or more processors are individually or collectively further configured to cause the wireless communication device to:
receive, via the one or more transceivers, a respective downlink control information (DCI) transmission for each PDSCH transmission, each respective DCI transmission containing a respective priority indicator for that PDSCH;
transmit, via the one or more transceivers, HARQ-ACK information corresponding to PDSCH transmissions associated with DCI transmissions that include a first priority indicator value as the compressed feedback information; and
transmit, via the one or more transceivers, HARQ-ACK information corresponding to PDSCH transmissions associated with DCI transmissions that include a second priority indicator value different from the first priority indicator value as the uncompressed feedback information.

7. The wireless communication device of claim 1, wherein, the one or more processors are individually or collectively further configured to receive the unbundled HARQ-ACK codebook size M via radio resource control (RRC) signaling.

8. The wireless communication device of claim 7, wherein, the one or more processors are individually or collectively further configured to receive the maximum HARQ-ACK codebook size N via RRC signaling.

9. A wireless communication device operable as a base station (BS), comprising:
one or more processors;
one or more transceivers coupled to the one or more processors; and
one or more memories coupled to the one or more processors,
wherein the one or more processors are individually or collectively configured to cause the wireless communication device to:
transmit to a user equipment (UE), via the one or more transceivers, an unbundled hybrid automatic repeat request acknowledgement HARQ-ACK codebook size M and a maximum HARQ-ACK codebook size N, wherein Nis greater than M;
transmit K downlink transmissions forming a downlink message to the UE via the one or more transceivers, wherein K is greater than N; and
receive, as feedback information, N-M bits of compressed feedback information for K-M of the K downlink transmissions and M bits of uncompressed feedback information for M of the K downlink transmissions, the M bits transmitted using an unbundled HARQ-ACK codebook, via the one or more transceivers;
wherein the N-M bits of compressed feedback information is a first portion of the feedback information in compressed form and indicates whether a first portion of the downlink message was successfully decoded by the UE; and
wherein the M bits of uncompressed feedback information is a second portion of the feedback information and indicates whether a second portion of the downlink message that differs from the first portion of the downlink message was successfully decoded by the UE.

10. The wireless communication device of claim 9, wherein the one or more processors are individually or collectively further configured to cause the wireless communication device to:
receive, via the one or more transceivers, the N-M bits of compressed feedback information corresponding to a first portion of the downlink transmissions; and
receive, via the one or more transceivers, the M bits of uncompressed feedback information corresponding to a second portion of the downlink transmissions transmitted after the first portion of the downlink transmissions.

11. The wireless communication device of claim 9, wherein the one or more processors are individually or collectively further configured to cause the wireless communication device to:
transmit, via the one or more transceivers, first control information to the UE, the first control information comprising scheduling information for a first portion of the K downlink transmissions;
transmit, via the one or more transceivers, second control information to the UE after transmitting the first control information, the second control information comprising scheduling information for a second portion of the K downlink transmissions;
receive, via the one or more transceivers, the N-M bits of compressed feedback information corresponding to the first portion of the downlink transmissions; and
receive, via the one or more transceivers, the M bits of uncompressed feedback information corresponding to the second portion of the downlink transmissions.

12. The wireless communication device of claim 9, wherein the K downlink transmissions comprise a physical downlink shared channel (PDSCH) transmissions; and
wherein the one or more processors are individually or collectively further configured to cause the wireless communication device to:
transmit, via the one or more transceivers, a respective downlink control information (DCI) transmission for each PDSCH transmission, each respective DCI transmission containing a respective priority indicator for that PDSCH;
receive, via the one or more transceivers, as the compressed feedback information, HARQ-ACK information corresponding to PDSCH transmissions associated with DCI transmissions that include a first priority indicator value; and
receive, via the one or more transceivers, as the uncompressed feedback information, HARQ-ACK information corresponding to PDSCH transmissions associated with DCI transmissions that include a second priority indicator value different from the first priority indicator value.

13. The wireless communication device of claim 9, wherein the one or more processors are individually or collectively further configured to transmit, via the one or more transceivers, the unbundled HARQ-ACK codebook size M via radio resource control (RRC) signaling.

14. A method of wireless communication operable by user equipment (a UE) comprising:
  receiving an unbundled hybrid automatic repeat request acknowledgement (HARQ-ACK) codebook size M and a maximum HARQ-ACK codebook size N, wherein N is greater than M;
  receiving K downlink transmissions forming a downlink message, wherein K is greater than N;
  transmitting N-M bits of compressed feedback information for K-M of the K downlink transmissions, wherein the compressed feedback information is a first portion of feedback information in compressed form, the feedback information indicating whether the K downlink transmissions were successfully decoded by the UE; and
  transmitting M bits of uncompressed feedback information for M of the K downlink transmissions using an unbundled HARQ-ACK codebook, wherein the uncompressed feedback information is a second portion of the feedback information that is different from the first portion of the feedback information.

15. The method of claim 14, further comprising:
  transmitting the NM bits of compressed feedback information corresponding to a first portion of the downlink message; and
  transmitting the M bits of uncompressed feedback information corresponding to a second portion of the downlink message received after the first portion of the downlink message.

16. The method of claim 14, further comprising:
  receiving second control information after first control information;
  transmitting the N-M bits of compressed feedback information corresponding to a first portion of the downlink message carried by downlink transmissions scheduled using the first control information; and
  transmitting the M bits of uncompressed feedback information corresponding to a second portion of the downlink message scheduled using the second control information.

17. The method of claim 14, further comprising:
  receiving for each downlink transmission of the K downlink transmissions, control information indicating whether feedback information corresponding to a portion of the downlink message carried by that downlink transmission is to be compressed.

18. The method of claim 14,
  wherein the K downlink transmissions comprise physical downlink shared channel (PDSCH) transmissions; and
  wherein the N-M bits of compressed feedback information comprise one or more bundled bits of HARQ-ACK information, each bundled bit of HARQ-ACK information corresponding to two or more PDSCH transmissions and indicating whether every PDSCH transmission corresponding to that bundled HARQ-ACK bit was successfully decoded or that one or more of the PDSCH transmissions corresponding to that bundled HARQ-ACK bit was not successfully decoded.

19. The method of claim 18, further comprising:
  receiving a respective downlink control information (DCI) transmission for each PDSCH transmission, each respective DCI transmission containing a respective priority indicator for that PDSCH;
  transmitting, in the compressed feedback information, HARQ-ACK information corresponding to PDSCH transmissions associated with DCI transmissions that include a first priority indicator value; and
  transmitting, in the uncompressed feedback information, HARQ-ACK information corresponding to PDSCH transmissions associated with DCI transmissions that include a second priority indicator value different from the first priority indicator value.

20. The method of claim 14, further comprising receiving the unbundled HARQ-ACK codebook size M via radio resource control (RRC) signaling.

21. The method of claim 20, further comprising receiving the maximum HARQ-ACK codebook size N via RRC signaling.

22. A method of wireless communication operable by a base station (BS), the method comprising:
  transmitting to a user equipment (UE) an unbundled hybrid automatic repeat request acknowledgement (HARQ-ACK) codebook size M and a maximum HARQ-ACK codebook size N, wherein N is greater than M;
  transmitting K downlink transmissions forming a downlink message to the UE, wherein K is greater than N;
  receiving, as feedback information, N-M bits of compressed feedback information for K-M of the K downlink transmissions and M bits of uncompressed feedback information for M of the K downlink transmissions, the M bits transmitted using an unbundled HARQ-ACK codebook;
  wherein the N-M bits of compressed feedback information is a first portion of the feedback information in compressed form and indicates whether a first portion of the downlink message was successfully decoded by the UE; and
  wherein the M bits of uncompressed feedback information is a second portion of the feedback information and indicates whether a second portion of the downlink message that differs from the first portion of the downlink message was successfully decoded by the UE.

23. The method of claim 22, wherein receiving the feedback information from the UE comprises:
  receiving the N-M bits of compressed feedback information corresponding to a first portion of the downlink transmissions; and
  receiving the M bits of uncompressed feedback information corresponding to a second portion of the downlink transmissions transmitted after the first portion of the downlink transmissions.

24. The method of claim 22, further comprising:
  transmitting first control information to the UE, the first control information containing scheduling information for a first portion of the K downlink transmissions; and
  transmitting second control information to the UE after transmitting the first control information, the second control information containing scheduling information for a second portion of the K downlink transmissions;
  receiving the N-M bits of compressed feedback information corresponding to the first portion of the downlink transmissions; and
  receiving the M bits of uncompressed feedback information corresponding to the second portion of the downlink transmissions.

25. The method of claim 22,
  wherein the K downlink transmissions comprise physical downlink shared channel (PDSCH) transmissions; and
  wherein the method further comprises:
    transmitting a respective downlink control information (DCI) transmission for each PDSCH transmission, each respective DCI transmission containing a respective priority indicator for that PDSCH;

receiving HARQ-ACK information corresponding to PDSCH transmissions associated with DCI transmissions that include a first priority indicator value as the compressed feedback information; and receiving HARQ-ACK information corresponding to PDSCH transmissions associated with DCI transmissions that include a second priority indicator value different from the first priority indicator value as the uncompressed feedback information.

26. The method of claim 22, further comprising transmitting the unbundled HARQ-ACK codebook size M via radio resource control (RRC) signaling.

* * * * *